(12) United States Patent
Kiely

(10) Patent No.: US 7,350,832 B1
(45) Date of Patent: Apr. 1, 2008

(54) SELF-ALIGNING, RAIN-TIGHT CONDUIT COUPLING/CONNECTOR ASSEMBLY

(75) Inventor: Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 152 days.

(21) Appl. No.: 11/215,542

(22) Filed: Aug. 30, 2005

(51) Int. Cl.
*F16L 17/00* (2006.01)

(52) U.S. Cl. .................................................. 285/354
(58) Field of Classification Search ............... 285/354, 285/386
See application file for complete search history.

(56) References Cited

U.S. PATENT DOCUMENTS

| | | | | |
|---|---|---|---|---|
| 924,039 | A * | 6/1909 | Clark | 285/10 |
| 1,178,714 | A * | 4/1916 | Griffin | 285/331 |
| 1,403,773 | A * | 1/1922 | Hanson | 285/332 |
| 1,522,999 | A * | 1/1925 | Campbell | 251/333 |
| 1,906,826 | A * | 5/1933 | Smith et al. | 285/331 |
| 2,067,773 | A * | 1/1937 | Long | 411/435 |
| 2,112,352 | A * | 3/1938 | Vetrano | 285/148.19 |
| 2,305,668 | A * | 12/1942 | Bruno | 285/331 |
| 2,726,104 | A | 12/1955 | Boitnott et al. | |
| 4,165,106 | A * | 8/1979 | Gladden | 285/39 |
| 4,540,205 | A * | 9/1985 | Watanabe et al. | 285/329 |
| 4,659,116 | A * | 4/1987 | Cameron | 285/27 |
| 5,355,908 | A * | 10/1994 | Berger et al. | 137/614.04 |
| 5,362,109 | A * | 11/1994 | Pacht | 285/39 |
| 5,553,902 | A * | 9/1996 | Powers | 285/350 |
| 6,832,790 | B2 | 12/2004 | Olson | |
| 6,994,380 | B2 * | 2/2006 | Cooke, Jr. | 285/354 |
| 2004/0094959 | A1 | 5/2004 | Shemtov | |

\* cited by examiner

*Primary Examiner*—David Bochna
(74) *Attorney, Agent, or Firm*—Melvin I. Stoltz

(57) ABSTRACT

By providing two mating components to which any desired threaded conduits are easily, securely affixed, with the mating components being constructed for interengagement with each other in a telescoping self aligning construction, an easily used, inexpensively produced, conduit coupling and connector assembly is achieved. Furthermore, the conduit coupling and connector assembly also incorporates a locking member which engages the two mating components and securely affixes the two components to each other, in a manner which provides the desired affixed interengagement, while also assuring that a rain free/moisture free engagement is attained.

15 Claims, 4 Drawing Sheets

SELF-ALIGNING, RAIN-TIGHT CONDUIT COUPLING/CONNECTOR ASSEMBLY

TECHNICAL FIELD

This invention relates to conduit couplings and connector assemblies and, more particularly, to threaded conduit couplings and connector assemblies which are self aligning and provide rain tight connections.

BACKGROUND ART

In constructing and/or renovating residential and/or commercial buildings, increasing effort is required in properly distributing electrical wires and cables throughout the building, as well as on the outside of the building. In this regard, numerous instances occur wherein conduits must be interconnected to each other in order to carry electrical wires and/or cables therein. Typically, these conduits incorporate threaded ends which must be mounted or interconnected to each other in order to achieve the desired connected interengagement. Furthermore, in those instances where the electrical wire/cable carrying conduits are mounted on the outside of the building or structure, the connected interengagement of the conduits must be achieved in a manner which assures a substantially rain tight or moisture-proof engagement, in order to prevent unwanted shorting of the wires or cables mounted in the conduits.

Although numerous prior art attempts have been made for providing conduit coupling/connector assemblies, these prior constructions have been unable to satisfy the industry needs and desires. Typically, these prior art constructions all suffer from the common problems of high costs, inability to provide reliable interconnections, and difficulty of assembly. Furthermore, these prior art constructions have been unable to provide a construction which is self aligning, while also being resistant to rain and moisture. Consequently, although prior art couplings and connectors exist in this field, such prior art systems have not been widely used due to their inherent expense and difficulties.

In addition, many of these prior products are difficult to employ, requiring the user to exercise extreme care in effectively engaging and securing a desired conduit or tube member to the connector assembly. As a result, these prior art systems have been unable to satisfy the needs existing in the industry.

Therefore, it is a principal object of the present invention to provide a conduit coupling and connector assembly which is easily employed by the user in a simple, straightforward manner.

Another object of the present invention is to provide a conduit coupling and connector assembly having the characteristic features described above, which allows any desired threaded conduit or tubing member to be quickly and easily telescopically inserted into the conduit coupling/connector assembly, while also providing secure, locking engagement thereof, in a construction which assures automatic self alignment.

Another object to the present invention is to provide a conduit coupling and connector assembly having the characteristic features described above, which also provides moisture and rainproof resistant capabilities.

Another object of the present invention is to provide a conduit coupling and connector assembly having the characteristic features described above which is capable of being produced inexpensively, thereby achieving a product which is low in cost and highly effective.

Other and more specific objects will in part be obvious and will in part appear hereinafter.

SUMMARY OF THE INVENTION

By employing the present invention, all of the difficulties in drawbacks found in prior art constructions have been eliminated and a simple, easily used, inexpensively produced, conduit coupling and connector assembly is achieved. In the present invention, the conduit coupling/connector assembly comprises two mating components to which any desired threaded conduits are easily, securely affixed. In addition, the mating components are constructed for interengagement with each other in a self aligning construction. Furthermore, the conduit coupling and connector assembly also incorporates a locking member which engages the two mating components and securely affixes the two components to each other, in a manner which provides the desired affixed interengagement, while also assuring that a rain free/moisture free engagement is attained.

In the preferred embodiment of the present invention, the conduit coupling/connector assembly is constructed with the two mating components preferably comprising substantially hollow cylindrically shaped members, each of which incorporate a threaded interior wall. In this way, each component is easily mounted to one of the threaded conduits which the user desires to have interconnected to each other for enabling the electrical wires and cables to be passed therethrough.

Furthermore, the first hollow cylindrically shaped member incorporates a recessed zone formed in the leading end thereof, while the second hollow cylindrically shaped member incorporates a forwardly extending nose or flange portion formed in the leading end thereof. In addition, the flange portion of the second hollow cylindrically shaped member is dimensioned for mating, aligned, interengagement with the recessed zone of the first hollow cylindrically shaped member.

In this way, the two components are constructed for mating, self aligned interengagement with each other, assuring that the desired secure and locked mounted engagement is realized. Furthermore, the construction also enables the two mating components to be co-axially aligned with each other, completely eliminating any interior offsets which establish ridges on which wires or cables can become snagged.

In the preferred embodiment of the present invention, one of the hollow cylindrically shaped members preferably incorporates a sealing ring receiving recess integrally formed therein. In this way, the secure, locked interengagement of the mating components also provides a rain tight or moisture resistant construction. In addition, as is further detailed below, the preferred construction of the first and second hollow cylindrically shaped members also creates a complex labyrinth-like pathway which extends from the outside surface to the sealing ring. As a result, any likelihood that moisture and/or rain would be capable of entering the assembly when all of the components are securely mounted to each other is further reduced. In view of this labyrinth-like pathway, in combination with the sealing ring incorporated therein, the overall construction is virtually incapable of having moisture or rain entering through the conduit/coupling connector assembly into the electrical wires contained in the conduits themselves.

In the preferred embodiment, the forwardly protruding flange portion formed on the second hollow cylindrically shaped member preferably incorporates an annular recess formed therein within which a sealing ring member is securely mounted. By employing this construction, it has been found that the desired rain tight and moisture proof construction is realized. However, if desired, the sealing ring member may be mounted in alternate locations, positions, or components.

The invention accordingly comprises the features of construction, combination of elements and arrangement of parts which will be exemplified in the construction hereinafter set forth, and the scope of the invention will be indicated in the claims.

THE DRAWINGS

For a fuller understanding of the nature and objects of the invention, reference should be had to the following detailed description taken in connection with the accompanying drawings, in which.

DETAILED DISCLOSURE

By referring to FIGS. 1-9, along with the following detailed discussion, the construction and operation of the preferred embodiment of conduit coupling and connector assembly 20 of the present invention can best be understood. As will become evident from the following detailed discussion, alternate embodiments of the present invention can be implemented without departing from the scope of this invention. Consequently, this disclosure and the drawings associated therewith are provided for exemplary purposes only and, as a result, should be treated as illustrative and not in a limiting sense.

Figure 1:
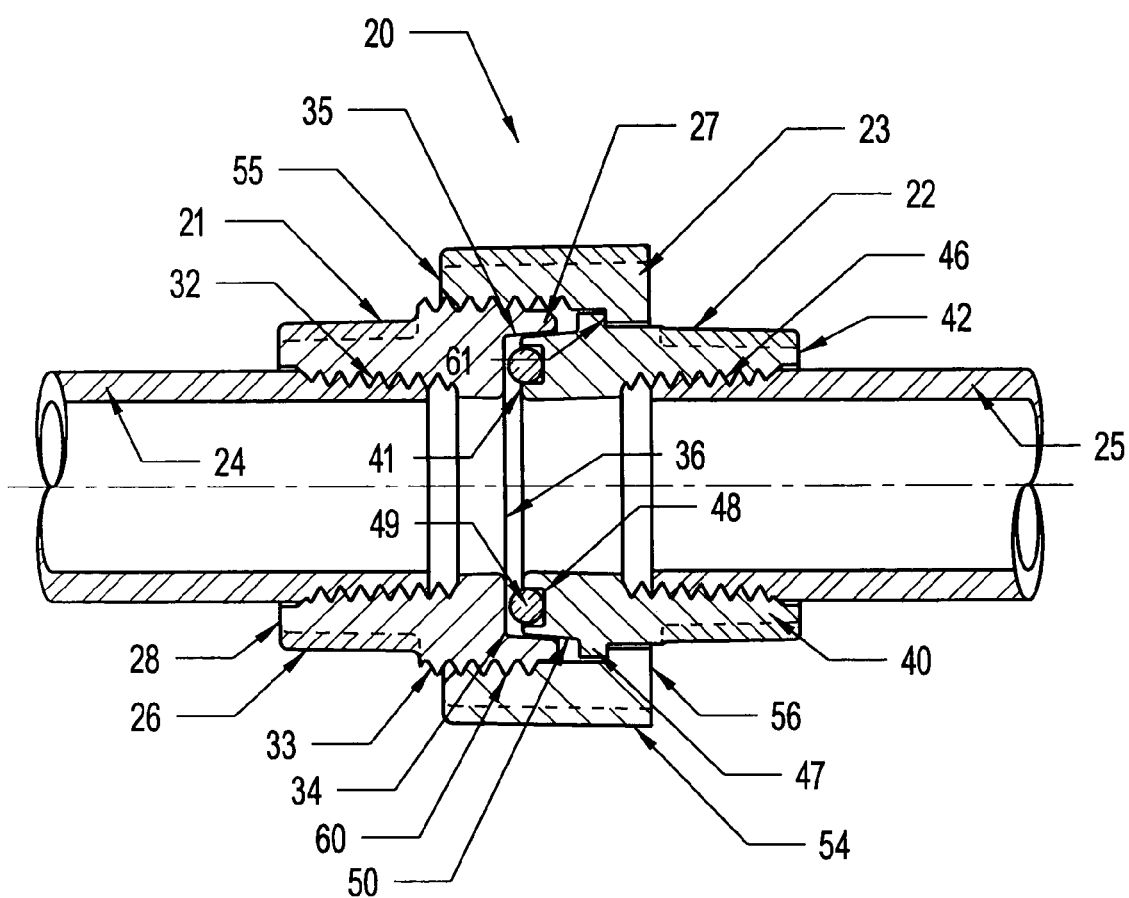
FIG. 1 is a cross-sectional side elevation view of the fully assembled conduit coupling/connector assembly of the present invention with two conduits mounted thereto.

In FIG. 1, conduit coupling and connector assembly 20 is depicted, in its fully assembled configuration, incorporating hollow, cylindrically shaped tubular member or sealing nut 21, interengaged with hollow, cylindrically shaped tubular member or slip nut 22. In addition, conduit coupling/connector assembly 20 also comprises locking member 23 which is mounted in peripheral, surrounding, locking interengagement with sealing nut 21 and slip nut 22, maintaining these components in secure, locked interengagement with each other. Furthermore, sealing nut 21 is threadedly mounted to conduit 24, while slip nut 22 is threadedly mounted to conduit 25. In this way, as is more fully detailed below, conduit coupling/connector assembly 20 is quickly and easily assembled into its secure, fully engaged, and interlocked-position, interconnecting conduits 24 and 25 with each other.

By referring to FIGS. 2-9, along with the following detailed discussion, the preferred construction of the components forming conduit coupling/connector assembly 20 of the present invention can best be understood. In this disclosure, each of the components will be fully discussed in detail independently, with the entire assembly, as depicted in FIG. 1, being detailed thereafter.

Figure 2:
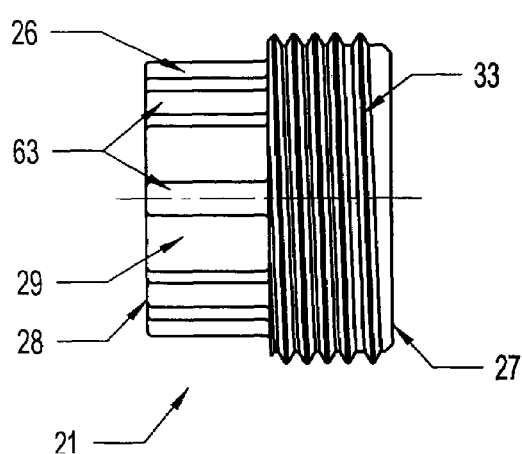
FIG. 2 is a side elevation view of the sealing nut component which forms a part of the conduit coupling/connector assembly of FIG. 1.
Figure 3:
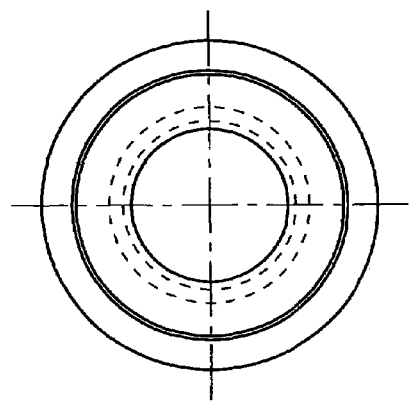
FIG. 3 is a front elevation view of the sealing nut component of FIG. 2.
Figure 4:
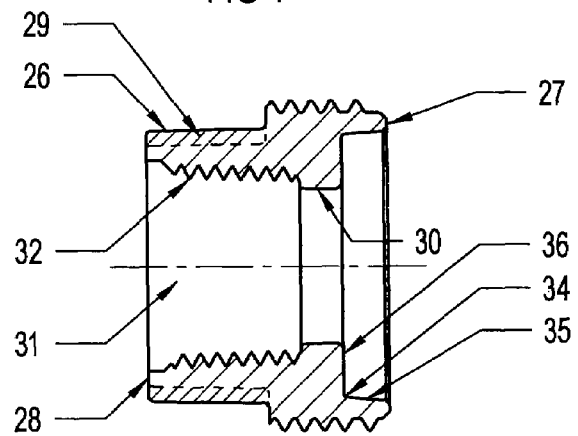
FIG. 4 is a cross-sectional side elevation view of the sealing nut component taken along line 4-4 of FIG. 3.

As shown in FIGS. 2-4, hollow cylindrically shaped tubular member or sealing nut 21 comprises cylindrical body 26 which incorporates front end 27, rear end 28, outside surface 29 and inside surface 30. In the preferred construction, inside surface 30 defines an internal passageway 31 extending from front end 27 to rear end 28. Furthermore, threaded zone 32 is formed on inside surface 30, extending from rear end 28 inwardly for a major portion of passageway 31.

As discussed above, any desired externally threaded conduit to which hollow cylindrically shaped tubular member or sealing nut 21 is to be connected is threadedly engaged with the threads of internal threaded zone 32 of passageway 31 in order to affix sealing nut 21 to the desired conduit. In this way, sealing nut 21 is quickly and easily securely mounted to any desired threaded conduit which the user wishes to have interconnected to another threaded conduit.

In addition, in the preferred embodiment, sealing nut 21 incorporates threaded zone 33 formed on outside surface 29 of body 26, axially extending from front end 27 towards rear end 28. In the preferred embodiment, the axial length of threaded zone 33 is sufficient to enable locking member 23 to fully engage and sealingly maintain sealing nut 21 in locked engagement with slip nut 22, as is more fully discussed below.

Finally, the construction of sealing nut 21 is completed by forming recess or cavity 34 in front end 27 of body 26. In its preferred construction, recess/cavity 34 is formed directly in the front surface or face of front end 27 of body 26, coaxially aligned with passageway 31 and comprising an overall diameter substantially greater than the diameter of passageway 31. In addition, recess/cavity 34 is constructed comprising inwardly sloping, side wall 35 which extends from the surface of front end 27 inwardly to base 36.

As is fully detailed below, this construction of recess/cavity 34 provides cooperating, sealing interengagement with the forwardly protruding front end of slip nut 22, providing automatic, self aligning cooperative, telescopic interengagement therewith, establishing the desired self-alignment and sealing engagement.

Figure 5:
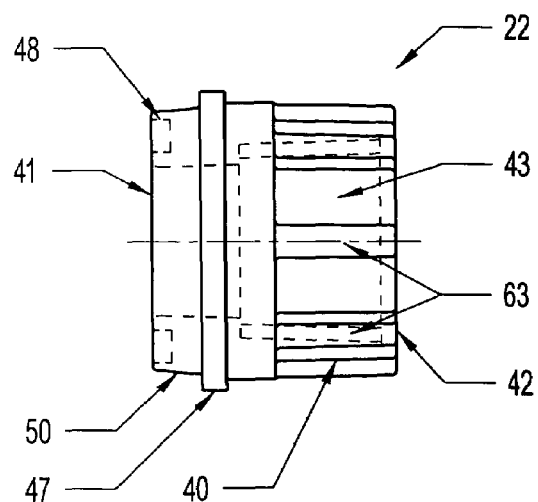
FIG. 5 is a side elevation view of the slip nut component which forms a part of the conduit coupling/connector assembly of FIG. 1.
Figure 6:
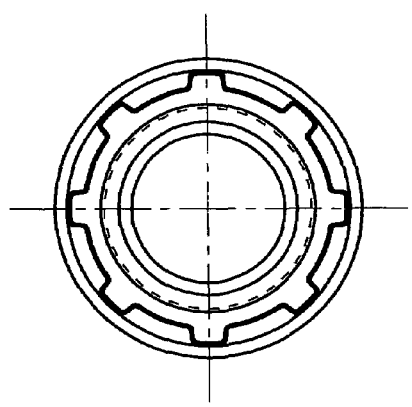
FIG. 6 is a front elevation view of the slip nut component of FIG. 5.
Figure 7:
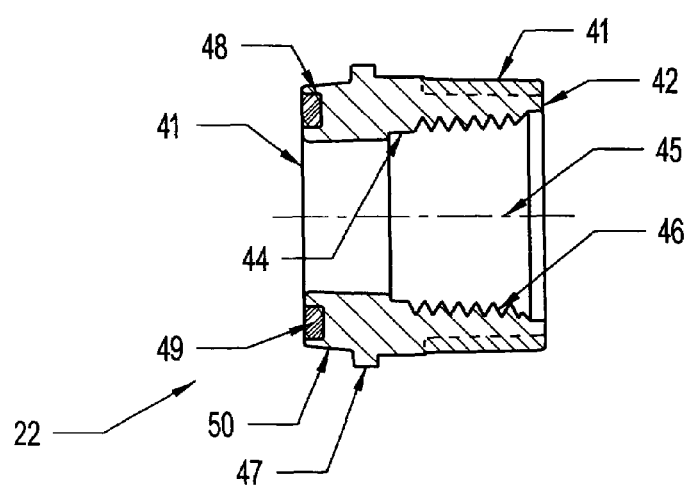
FIG. 7 is a cross-sectional side elevation view of the slip nut component taken along line 7-7 of FIG. 6.

In FIGS. 5-7, the preferred embodiment of slip nut 22 is fully depicted. In this preferred construction, slip nut 22 comprises a hollow, cylindrically shaped tubular member or body 40 which incorporates front end 41, rear end 42, outside surface 43 and inside surface 44. In the preferred construction, inside surface 44 defines an internal passageway 45 extending from front-end 41 to rear end 42. Furthermore, threaded zone 46 is formed on inside surface 44 extending from rear end 42 inwardly for a major portion of passageway 45.

By employing this construction, any desired externally threaded conduit to which cylindrically shaped tubular member or slip nut 22 is to be connected is able to be threadedly engaged with the threads of internal threaded zone 46 of passageway 45 in order to affix slip nut 22 to the desired conduit. In this way, slip nut 22 is quickly and easily securely mounted to any desired threaded conduit which the user wishes to have interconnected to the threaded conduit affixed to sealing nut 21.

In addition, in the preferred construction of this embodiment of the present invention, slip nut 22 incorporates flange 47 formed on outside surface 43 of body 40, radially extending outwardly therefrom, positioned generally adjacent front end 41. As is more fully detailed below, radially extending flange 47 is positioned for cooperative interengagement with locking member 23, in order to enable slip nut 22 to be securely affixed in locked interengagement with sealing nut 21.

The construction of slip nut 22 is completed by forming sealing member receiving groove 48 in front end 41 of body 40. In addition, in the preferred construction, sealing member or O-ring 49 is placed in groove 48 in order to assist in providing a watertight or moisture proof seal construction when slip nut 22 is mounted in cooperating locked interengagement with sealing nut 21.

Furthermore, slip nut 22 is constructed with sloping side wall 50 extending from front end 41 to flange 47. In addition, the overall diameter and construction of sloping side wall 50 is configured for assuring mating, aligned interengagement of sloping side wall 50 in recess/cavity 34 of body 26 of sealing nut 21. By employing this construction, automatic interengagement and self alignment of slip nut 22 with sealing nut 21 is assured.

Figure 8:
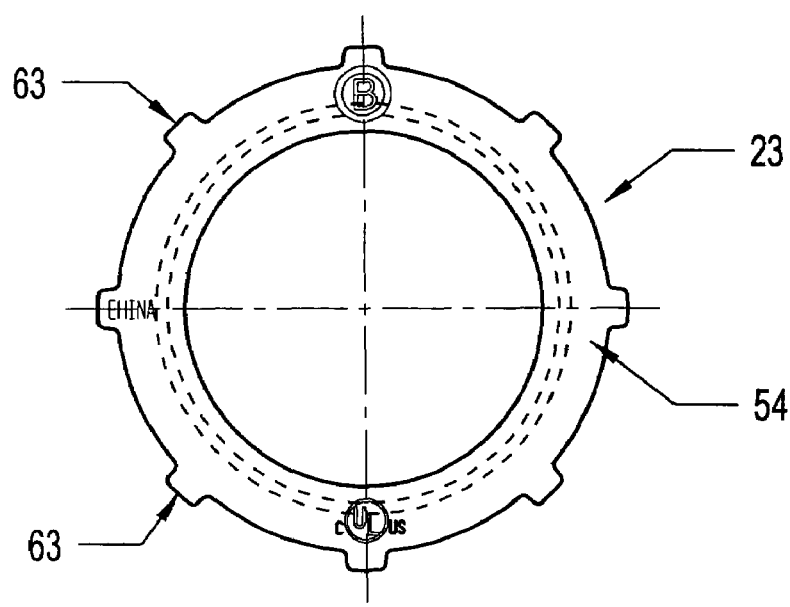
FIG. 8 is a rear elevation view of the locking member component which forms a part of the conduit coupling/connector assembly of FIG. 1.
Figure 9:
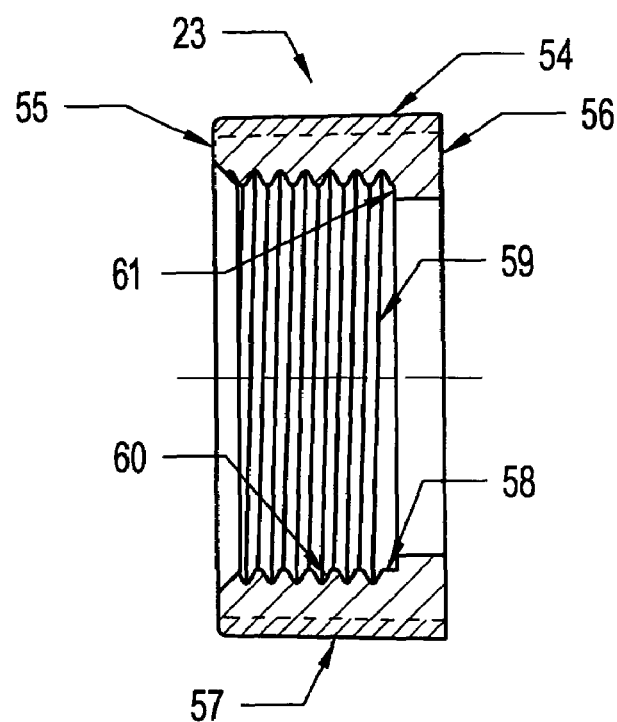
FIG. 9 is a cross-sectional side elevation view of the locking member component taken along line 9-9 of FIG. 8.

The final component employed in constructing conduit coupling/connector assembly 20 is locking member 23, which is clearly depicted in FIGS. 8 and 9. In the preferred construction, locking member 23 comprises a generally hollow, cylindrically shaped body 54 which comprises front end 55, rear end 56, outside surface 57 and inside surface 58. As depicted, inside surface 58 defines an internal passageway 59 which extends from front end 55 to rear end 56.

Furthermore, threaded zone 60 is formed on inside surface 58, extending from front end 55 inwardly through a major portion of passageway 59. In addition, ledge 61 radially extends inwardly from inside surface 58 directly adjacent threaded zone 60. By employing radially extending ledge 61 and positioning ledge 61 directly adjacent threaded zone 60, an abutment stop is created which is positioned for contacting and lockingly engaging flange 47 of slip nut 22 whenever locking member 23 is mounted in contact with slip nut 22 for threaded, locking interengagement of slip nut 22 with sealing nut 21.

Finally, in the preferred construction, sealing nut 21, slip nut 22 and locking member 23 each comprise radially extending ribs 63 which are formed on the outside surface of each component, with ribs 63 radially extending outwardly for providing a raised surface for assisting in the threaded engagement of each component whenever desired. In this way, the threaded secure interengagement of sealing nut 21 and slip nut 22 with associated threaded conduits is quickly and easily achieved, while the mounted, locked interengagement of locking member 23 with sealing nut 21 and slip nut 22 is also easily achieved.

As a result of the construction detailed above, conduit coupling/connector assembly 20 of the present invention is quickly and easily mounted in the desired position, securely affixing and lockingly engaging conduits 24 and 25 in cooperating relationship with each other. As shown in FIG. 1, whenever a user desires to mount two conduits in secure interengagement with each other, hollow, cylindrically shaped member/sealing nut 21 is securely affixed to conduit 24, by threadedly engaging the external threads of conduit 24 with threaded zone 32 of sealing nut 21.

Then conduit 25 is securely affixed to hollow cylindrically shaped member/slip nut 22, with locking member 23 peripherally engaged therewith, by threaded engaging threaded zone 46 of slip nut 22 to the external threads of conduit 25. Once these components are mounted in this manner, locking member 23 is ready to be employed for securely, lockingly interengaging sealing nut 21 with slip nut 22.

In order to achieve the desired secure, locked interengagement, forwardly protruding front end 41 of slip nut 22 is advanced into aligned interengagement with recess/cavity 34 of sealing nut 21. As detailed above, forwardly protruding front end 41 is constructed with side wall 50 sloping outwardly as wall 50 extends from front end 41 to flange 47. This sloping configuration is constructed for cooperating, aligned, telescopic interengagement in recess/cavity 34 of sealing nut 21.

With recess/cavity 34 incorporating sloping side wall 35, which slopes in a complementary direction to wall 50, front end 41 is able to telescopically advance in sliding interengagement directly into recess/cavity 34, with the surface of front end 41 contacting base 36 of recess/cavity 34. Furthermore, with sealing member or O-ring 49 mounted in groove 48 of slip nut 22, O-ring 49 engages base 36 forming a water tight sealed interengagement therewith. In this way, rain tight/waterproof interengagement of sealing nut 21 with slip nut 22 is achieved. In addition, sealing nut 21 and slip nut 22 are co-axially aligned with each other, eliminating any ridge or offset, as is found in the prior art. As a result, any wires or cables which are fed through coupling/connector assembly 20 are easily passed therethrough, without any snagging.

In order to assure that the secure, locked interengagement of sealing nut 21 with slip nut 22 is realized, with the desired rain tight/waterproof configuration being attained, locking member 23 is employed. With locking member 23 peripherally surrounding slip nut 22, threaded zone 60 of locking member 23 is advanced into threaded engagement with external threaded zone 33 of sealing nut 21.

By rotationally advancing locking member 23 into threaded engagement with threaded zone 33 of sealing nut 21, radially extending ledge 61 of locking member 23 abuttingly engages radially extending flange 47 of slip nut 22. In addition, as locking member 23 is continuously rotated into further threaded interengagement with threaded zone 33 of sealing nut 21, slip nut 22 and sealing nut 21 are drawn into secure, locked, engagement with each other. In addition, due to the self aligning construction of sealing nut 21 and slip nut 22, as detailed above, the securement of locking member 23 in the desired manner provides assurance that a secure, trouble-free, locked engagement of sealing nut 21 and slip nut 22 is realized.

Furthermore, as clearly depicted in FIG. 1, the construction of the components forming conduit coupling/connector assembly 20 of the present invention establishes a complex labyrinth-like path or passageway through which any water must seep, if rain or moisture is to penetrate from the outside surfaces of conduit coupling/connector assembly 20 into the interior passageways of sealing nut 21 and/or slip nut 22. Furthermore, since front end 41 of slip nut 22 incorporates O-ring 49 which is forced into sealing engagement with base surface 36 of recess/cavity 34, further assurance is provided that moisture and/or rain is virtually incapable of penetrating from the outside surfaces into the internal passageways of conduit coupling/connector assembly 20.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Having described my invention, what I claim as new and desire to secure by Letters Patent is:

1. A conduit coupling and connector assembly constructed for securely affixing two conduits in juxtaposed, spaced, cooperating engagement with each other, said conduit coupling/connector assembly comprising:
  A. a first, hollow, cylindrically shaped, tubular member incorporating an elongated central passageway formed therein and comprising
    a) a first end constructed for receiving and being securely affixed to one end of a first conduit, and
    b) a second end incorporating a cavity/recess formed therein, said cavity/recess extending axially inwardly from said second end and being defined by a sidewall and an enlarged, substantially flat base portion extending from the sidewall to the central passageway;
  B. a second, hollow, cylindrically shaped, tubular member comprising
    a) a first end constructed for receiving and being securely affixed to one end of a second conduit, and
    b) a second end incorporating a sealing member receiving groove formed therein, with said second end being dimensioned for telescopic insertion and engagement in the cavity/recess of the second end of the first tubular member;
  C. an O-ring mounted in the receiving groove of the second end of the second hollow, cylindrically shaped, tubular member with said O-ring being positioned for sealing contacting engagement with the enlarged, substantially flat base portion of the cavity/recess of the first, hollow, cylindrically shaped, tubular member, thereby preventing the passage of moisture/water into the internal passageways of the first and second tubular members;
  D. a locking member comprising a hollow, cylindrically shaped body, cooperatively associated and engaged with said first and second hollow cylindrically shaped tubular members for enabling said tubular members to be lockingly interengaged with each other and for maintaining said tubular members in locked interengagement with each other when activated by the user;
whereby a conduit coupling/connector assembly is achieved which is capable of being quickly and easily securely affixed to cooperating conduits as well as being lockingly interengaged for assuring and maintaining the components of said coupling/connector assembly in secure, affixed, mounted interengagement with each other.

2. The conduit coupling/connector assembly defined in claim 1, wherein the sidewall forming the cavity/recess of the first, hollow, cylindrically shaped tubular member is further defined as sloping inwardly from the second end surface of the first tubular member to the enlarged, substantially flat base portion, which defines the bottom of said cavity/recess.

3. The conduit coupling/connector assembly defined in claim 2, wherein the second end of the second, hollow, cylindrically shaped tubular member is further defined as comprising a sloping side wall extending from the second end surface thereof and being dimensioned for sliding, telescopic, aligned interengagement with the sidewall of the cavity/recess of the first hollow, cylindrically shaped, tubular member.

4. The conduit coupling/connector assembly defined in claim 3, wherein said second, hollow, cylindrically shaped, tubular member further comprises a flange formed on the outside surface thereof adjacent the terminating end of the sloping side wall, with said flange extending radially outwardly.

5. The conduit coupling/connector assembly defined in claim 4, wherein said first, hollow, cylindrically shaped, tubular member comprises a threaded zone formed on the outside surface thereof directly adjacent the front end of said tubular member.

6. The conduit coupling/connector assembly defined in claim 5, wherein said locking member comprises an inside wall defining a central internal passageway extending through said locking member, with a threaded zone formed in the inside wall and a ridge portion formed adjacent to the threaded zone and extending radially inwardly therefrom, whereby the ridge portion of the locking member engages in the flange of the second tubular member and the threaded zone of the locking member engages with the threaded zone of the first tubular member, thereby enabling the locking member to securely affix and lockingly engage the first tubular member with the second tubular member.

7. The conduit coupling/connector assembly defined in claim 1, wherein said first and second tubular members are secured in telescopic, aligned interengagement with each other, and maintained in locked engagement by the locking member, with the internal passageways of said first and second tubular members establishing an elongated, continuous passageway, free from ridge forming offsets.

8. The conduit coupling/connector assembly defined in claim 7, wherein said assembly establishes a labyrinth-like pathway from the outside surface into the internal passageways of the assembly thereby virtually eliminating any possibility that water or moisture can pass from the external environment into the interior of coupling/connector assembly.

9. The conduit coupling/connector assembly defined in claim 1, wherein the components thereof each comprise radially extending ribs formed on the outside circumferential surface thereof for ease of handling and axial rotation of said components.

10. The conduit coupling/connector assembly defined in claim 1, wherein the first and second hollow tubular members each comprise internally threaded zones for receiving and being threadedly mounted to any desired conduits.

11. A conduit coupling and connector assembly constructed for securely affixing two conduits in juxtaposed, spaced, cooperating engagement with each other, said conduit coupling/connector assembly comprising:
  A. a first, hollow, cylindrically shaped, tubular member incorporating an elongated central passageway formed therein and comprising
    A. a first end constructed for receiving and being securely affixed to one end of a first conduit,
    b) a second end incorporating a cavity/recess formed therein, said cavity/recess extending axially inwardly from said second end and being defined by a sidewall and an enlarged, substantially flat base portion, said sidewall sloping inwardly from the second end surface of the first tubular member to the base portion, which defines the bottom of said cavity/recess, and extends from the sidewall to the central passageway; and c) a threaded zone formed on the outside surface thereof directly adjacent the front end of said tubular member;

B. a second, hollow, cylindrically shaped, tubular member comprising a) a first end constructed for receiving and being securely affixed to one end of a second conduit, and b) a second end incorporating a sealing member receiving groove formed therein, with said second end being dimensioned for telescopic insertion and engagement in the cavity/recess of the second end of the first tubular member; and comprising a sloping side wall extending from the second end surface thereof and being dimensioned for sliding, telescopic, aligned interengagement with the sidewall of the cavity/recess of the first hollow, cylindrically shaped, tubular member; and further comprising a flange formed on the outside surface thereof adjacent the terminating end of the sloping side wall, with said flange extending radially outwardly;

C. an O-ring mounted in the receiving groove of the second end of the second hollow, cylindrically shaped, tubular member with said O-ring being positioned for sealing contacting engagement with the enlarged, substantially flat base portion of the cavity/recess of the first, hollow, cylindrically shaped, tubular member, thereby preventing the passage of moisture/water into the internal passageways of the first and second tubular members; and D. a locking member comprising a hollow, cylindrically shaped body, cooperatively associated and engaged with said first and second hollow cylindrically shaped tubular members for enabling said tubular members to be lockingly interengaged with each other and for maintaining said tubular members in locked interengagement with each other when activated by the user, and comprising an inside wall defining a central internal passageway extending through said locking member, with a threaded zone formed in the inside wall and a ridge portion formed adjacent to the threaded zone and extending radially inwardly therefrom, whereby the ridge portion of the locking member engages in the flange of the second tubular member and the threaded zone of the locking member engages with the threaded zone of the first tubular member, thereby enabling the locking member to securely affix and lockingly engage the first tubular member with the second tubular member;

whereby a conduit coupling/connector assembly is achieved which is capable of being quickly and easily securely affixed to cooperating conduits as well as being lockingly interengaged for assuring and maintaining the components of said coupling/connector assembly in secure, affixed, mounted interengagement with each other.

12. The conduit coupling/connector assembly defined in claim 11, wherein said first and second tubular members are secured, in telescopic, aligned interengagement with each other, and maintained in locked engagement by the locking member, with the internal passageways of said first and second tubular members establishing an elongated, continuous passageway, free from ridge forming offsets.

13. The conduit coupling/connector assembly defined in claim 11, wherein said assembly establishes a labyrinth-like pathway from the outside surface into the internal passageways of the assembly thereby virtually eliminating any possibility that water or moisture can pass from the external environment into the interior of coupling/connector assembly.

14. The conduit coupling/connector assembly defined in claim 11, wherein the components thereof each comprise radially extending ribs formed on the outside circumferential surface thereof for ease of handling and axial rotation of said components.

15. The conduit coupling/connector assembly defined in claim 11, wherein the first and second hollow tubular members each comprise internally threaded zones for receiving and being threadedly mounted to any desired conduits.

* * * * *